United States Patent
Stephenson et al.

(10) Patent No.: US 9,465,922 B2
(45) Date of Patent: Oct. 11, 2016

(54) METHODS FOR SECURE DATA DISTRIBUTION

(75) Inventors: Bryan Stephenson, Alviso, CA (US); Jun Li, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1407 days.

(21) Appl. No.: 12/357,745

(22) Filed: Jan. 22, 2009

(65) Prior Publication Data

US 2010/0186067 A1    Jul. 22, 2010

(51) Int. Cl.
*G06F 21/10* (2013.01)
*G06F 21/33* (2013.01)

(52) U.S. Cl.
CPC .............. *G06F 21/10* (2013.01); *G06F 21/335* (2013.01); *G06F 2221/0737* (2013.01)

(58) Field of Classification Search
CPC .................. G06F 21/10; G06F 21/335; G06F 2221/0737
USPC .................................................... 726/1, 2, 4
See application file for complete search history.

(56) References Cited

U.S. PATENT DOCUMENTS

| | | | |
|---|---|---|---|
| 5,889,868 A * | 3/1999 | Moskowitz et al. | 713/176 |
| 2003/0058277 A1 * | 3/2003 | Bowman-Amuah | 345/765 |
| 2005/0135654 A1 * | 6/2005 | Li et al. | 382/100 |
| 2007/0033146 A1 * | 2/2007 | Hollar | 705/57 |
| 2008/0052359 A1 * | 2/2008 | Golan et al. | 709/206 |
| 2008/0215891 A1 | 9/2008 | Horne et al. | |
| 2008/0222734 A1 | 9/2008 | Redlich et al. | |

OTHER PUBLICATIONS

A Model for Data Leakage Detection Panagiotis Papadimitriou, Hector Garcia-Molina Oct. 2008.*
Security of Relational Databases in Business Outsourcing Ersin Uzun and Bryan Stephenson © Copyright 2008 Hewlett-Packard Development Company, L.P.*
Watermarking Relational Databases Rakesh Agrawal, Jerry Kiernan Proceedings of the 28th VLDB Conference, Hong Kong, China, 2002.*
Muralidhar et al., Security of Random Data Perturbation Methods, ACM Transactions on Database Systems, vol. 24, No. 4, Dec. 1999, pp. 487-493.
Blaze et al., Decentralized Trust Management, Proceedings of IEEE Symposium on Security and Privacy, 1996, pp. 164-173.
Li et al., Access Control for the Services Oriented Architecture, Proceedings of the 2007 ACM Workshop on Secure Web Services, Fairfax, VA, 2007, pp. 9-17.
Xie et al., Integrity Auditing of Outsourced Data, Proceedings of the 33rd International Conference on Very Large Data Bases, Vienna, Austria, 2007, pp. 782-793.

(Continued)

*Primary Examiner* — Kambiz Zand
*Assistant Examiner* — Benjamin Kaplan
(74) *Attorney, Agent, or Firm* — Trop, Pruner & Hu, P.C.

(57) ABSTRACT

A method for secure distribution of data in an interchange network, comprises having a network in which data records stored on at least one computer; and including an authorization service, where the authorization service grants a contractor access to at least a portion of the data records; and a watermarking module that adds one or more artificial records to said portion. The artificial records cannot be distinguished from the data records by the contractor and are valid for processing in the same way as the data records.

19 Claims, 2 Drawing Sheets

(56) References Cited

OTHER PUBLICATIONS

Mykletun et al., Authentication and Integrity in Outsourced Databases, ACM Transactions on Storage, vol. 2, No. 2, 2006, pp. 107-138.

Zhao, A WWW Service to Embed and Prove Digital Copyright Watermarks, Proc. of the European Conference on Multimedia Applications, Services and Techniques, Belgium, 1996.

Zhou et al., Query-based Watermarking for XML Data, Proceedings of the 2nd ACM Symposium on Information, Computer and Communications Security, Singapore, 2007, pp. 253-264.

\* cited by examiner

METHODS FOR SECURE DATA DISTRIBUTION

BACKGROUND

Demanding market conditions encourage many companies to outsource certain business processes and associated activities to a third party. Maintaining proper confidentiality of business-critical data is a significant concern for this approach. In many cases, third-party service providers need access to a company's intellectual property, client/customer data, and/or other confidential information to carry out their services. However, a service provider may not be fully trusted or may not be securely administered. Furthermore, it can be difficult or nearly impossible to enforce confidentiality policies across different administrative domains.

Some types of data (e.g. relational databases) are particularly easy to duplicate, and a service provider may have a financial incentive to redistribute commercially valuable data to unauthorized parties. Administration of data distribution can be enhanced when it is possible to identify the source of unauthorized data leaks or further, when service providers are less incentivized to leak data because they are aware of the higher likelihood of being discovered. Outsourcing approaches can therefore benefit from methods of data distribution that allow a company to dissuade data leakage and to detect it when it occurs.

BRIEF DESCRIPTION OF THE DRAWINGS

Features and advantages of the disclosure will be apparent from the detailed description which follows, taken in conjunction with the accompanying drawings, which together illustrate, by way of example, features of the invention; and, wherein.

DETAILED DESCRIPTION

Figure 1:
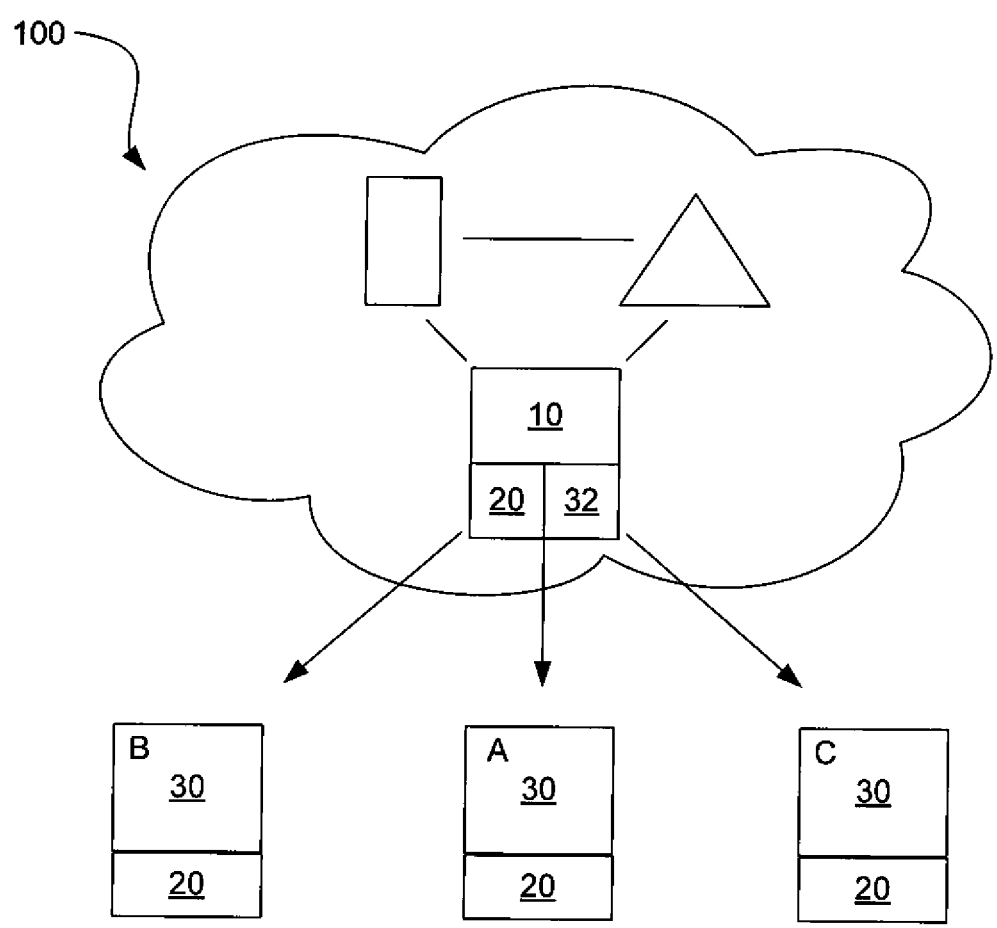
FIG. 1 is a schematic view of systems and methods of data distribution in accordance with one embodiment of the present invention.

The present disclosure provides methods for secure data distribution and secure network structures based on watermarking approaches and access authorization, either individually or in combination. Watermarking data involves embedding hidden information into the data that can be used to determine the origin of the data. Watermarking techniques that are prevalent in the art are commonly used to protect digital files, such as video data or photographic data. Most of these techniques involve manipulating some numerical attribute of the data. For example, video data is often watermarked by modifying some or all of the least significant bits of the image data. One disadvantage to this approach is that this is a well-known technique, so an adversary intent on redistributing the data can first randomize the bits used to place the watermark into the data. This destroys the watermark, so that the copied data cannot be traced to its source.

Many sensitive and commercially valuable data types are not digital media files, but are rather sets of records containing information such as customer or client information (e.g. names, addresses, salaries, account numbers). This type of data often is handled in flat databases or, more commonly, relational databases. Bit manipulation and other data perturbation-based approaches can sometimes be adapted for use with this kind of data. For example, a set of measurements may be watermarked by modifying the least significant digit of one or more measurements.

However, there are limits to the usefulness of perturbation techniques. For one, data perturbation is most workable when the dataset includes some numerical attribute that can be manipulated. Furthermore, data perturbation also assumes that this manipulation does not significantly affect the viability of the data. The example of real number measurements illustrates a data type in which both of these assumptions are valid. However, this approach does not address data in which there are no manipulable numerical attributes. Furthermore, many kinds of data are intolerant of perturbation. Unlike the real number measurements, where changing a least significant digit does not appreciably change the information conveyed, changing some data may render it less valuable or even useless. Some examples include corporate data such as account numbers and social security numbers, which are intolerant to even small errors.

The present disclosure describes techniques of watermarking data sets that address the shortcomings discussed above. According to a general embodiment, the present disclosure sets forth a method for secure distribution of data in a network. As used herein, "network" generally refers to assemblages of computers that are interconnected according to some scheme that allows the distribution and administration of data and services among the computers. This can refer to networks in which the connections between computers are substantially fixed, such as by wired or optical connections. The term also applies to other networks in which connections can be more transitory, such as networks featuring web-based access to central databases by client computers. Secure wireless connections can also be present in either of these systems.

One type of network amenable to methods in accordance with the present invention is a transaction management network architecture which provides for the interchange of data and services between parties on the network. One example of such an architecture is a "cloud computing" network, where large centralized databases can be accessed from anywhere on the web and using any web-capable machine, including wireless and mobile devices. At the same time, information and service responsibilities may be distributed among participants in the network. Such an arrangement can be particularly dependent on reliable data distribution, so as to make large applications more scalable by distributing them among participating clients. Accordingly, in a particular embodiment of the present disclosure, the network is an interchange network. In a more particular embodiment, the network is a cloud computing network.

In a general embodiment, this method includes a network in which data records are stored on one or more computers. As used herein, the term "computer" can refer to a single machine with one or more processors as well as to a plurality of machines that are connected so as to serve a joint data storage function. Regarding terms used herein to describe network structure, "central" generally refers to the machine(s) that make up a common area or hub of the network, where the majority of storage and network administration is performed, while "peripheral" or "remote" or "client" may be used interchangeably to describe machines that are part of the network outside the central machine(s). They are generally, but not necessarily, remote in location from the central machine(s). These may be permanently connected machines, or they may be temporarily connected by web-based or other login protocols.

The network can also comprise an authorization service. The authorization service functions generally to govern access to the data records, with aspects of that governance including, but not limited to, data authentication or validation, granting of access privileges, and client authorization. The term "service" in this context particularly refers to machine-executable code, residing on and executed by one or more machines in the network, that performs the functions described herein when it is executed. In one embodiment, the authorization service may principally reside and function centrally in the network, rather than on a peripheral machine, although it may interact with routines residing on or temporarily operating on a peripheral machine. In another embodiment, the authorization service may reside remotely. In an another embodiment, the authorization service may be a program module that operates principally on a client machine in the network and can govern access to data records over which that client has been granted certain rights or permissions. In still another embodiment, the authorization service may be token-based, where providers in the network may grant or receive authorization tokens which may be used to negotiate access from an authorization service.

According to the method, the authorization service grants access to the data records to certain parties. The parties accessing the data can be any person or group of persons that are authorized to receive access for some purpose. Such parties will be generally referred to herein as "contractors," though in some cases these parties may be other than contractors, e.g., employees, networks of people, etc. Generally they may be operating under an established contractual agreement with an entity that controls and/or has rights in the data, though it will be understood that a contractor may be an independent party involved in a more limited transaction with the entity.

The access granted to the contractor can involve certain rights, including the right to move or copy the data to a client computer or to some remote storage medium, or the right to make and keep a hardcopy of the data. In some instances, this access is limited to a certain portion of the data comprising one or more data records. In view of the fact that interchange networks may be highly distributed in nature, it should be understood that the term "database" may refer not only to a more central collection of data, but may refer more generally to a source of data to which a contractor may want access. As such, as discussed below, this source may be held by another contractor. The portion of the data to which a contractor is granted access rights may be termed a "view" of the database. This term may be used to refer to that portion of the data in any form in which the contractor may possess it, whether it be original files or copies thereof, and whether electronically stored, displayed on a display device, or in one or more hard copies. For purposes of explanation herein, a view may principally refer to a copy of at least a portion of a data set, where said copy is received by a party from another party holding the data set. However, it should be understood that the methods disclosed herein are amenable to use with other types of views as defined above.

An example of such an arrangement is shown in FIG. 1, in which an interchange network 100 comprises a number of components, including a database 10 of data records stored on one or more computers. Access to the database can be granted via an authorization service 20 and provided to one or more contractors 30. As noted above and as reflected in FIG. 1, the authorization service may be a central component of the network, or may be distributed among participating members of the network. Distributed authorization modules can serve to govern a contractor's access to a data view and/or be used by the contractor to manage further distribution of access rights to the view.

In accordance with an embodiment of the method, a watermarking module 32 watermarks the view granted to the contractor, adding to the view a watermark (e.g. A, B, C in FIG. 1), including one or more artificial records. The watermarking module may be a separate program, or it may be one part of the authorization service. One difference between artificial records and actual data records is that the artificial records do not provide authentic information, i.e. information having a significant functionality outside of watermarking. In a particular aspect, a further difference can be that, unlike the actual data records which usually have some external relevance, the artificial records are generated for the sole purpose of constituting a watermark. In another aspect, artificial records may be different from the actual records in that the artificial records do not reside in the database, but are generated based on a particular view that is created.

In most other respects, however, these artificial records outwardly appear like any of the other data records in the database and are treated as such. More particularly, it can be said that the artificial records each have correct semantics and are qualified for the same types of data processing as any of the actual data records. For example, in a database of customer addresses, a letter to an artificial mailing address will be delivered by the post office. However, the letter may be delivered to a company address or to an employee, rather than to an actual customer. This activity would alert the data administrator that someone had attempted to use the data. Such an artificial mailing address would therefore be an example of an artificial record having correct semantics relative to data records.

A particular advantage arising from this characteristic of the artificial records is that they can be added without the contractor's knowledge. In a further aspect, because the artificial records are outwardly like the actual data records, the contractor cannot distinguish the artificial records from the data records. This feature can be enhanced by interleaving the artificial records among the data records in a random fashion. This combination of visibility and indistinguishability produces a watermark that is simultaneously hidden and "in plain sight." In a more particular aspect, adding the artificial records does not involve changing or manipulating the actual data records. This is to be contrasted with the data perturbation-based methods discussed above. This method is therefore particularly useful for types of data that are intolerant of error or modification of the actual data records.

These characteristics can be important in maintaining the integrity of the leak detection method, in that the contractor cannot use conventional methods to detect the watermark and remove it. As such, if the data is later distributed to unauthorized parties or otherwise disseminated, it can be recognized by the presence of the artificial records. In a more particular embodiment, the watermark added to each contractor's view can be unique to that contractor. More particularly, each contractor's watermark may comprise completely unique records or merely a unique combination of records. This is illustrated in FIG. 1 through unique letter designations, where A is different from B, and both A and B are different from C, and so on. In this way, if the watermarked data is leaked, it can be recognized as having come from the contractor. In another particular embodiment, the watermark may be sufficiently unique so that its recipient can be identified by it, while exhibiting some degree of overlap with the watermarks of others.

As with other watermarking approaches, a principal strategy for an unscrupulous contractor seeking to leak sensitive data may be to detect and remove the watermark. If the watermark is undetectable, the next step may be to omit a portion of the data in the hope that the watermark was in omitted portion and not the disseminated portion. The method disclosed herein makes this strategy less attractive in a number of ways. As mentioned above, watermarks using least significant bits or digits may be removed easily by simply omitting all such bits or digits without significantly affecting the value of the data. However, artificial records in accordance with the present disclosure are not easily detectable because they appear to be complete and authentic data records. Furthermore, every attempt to select and remove watermark records runs the risk of mistakenly removing real records instead. Therefore, omitting a number of records in hopes of omitting the watermark is not only likely to be unsuccessful, but it can greatly reduce the value of the data.

This deterrent to watermark circumvention may be enhanced by inserting artificial records at a frequency that provides a given likelihood that a set of data records includes at least one artificial record. To have not more than a $f_n$ probability of not detecting the watermark in a random subset of data records of size N, the ratio P of artificial records to all the records in the database should satisfy $f_n > (1-P)^N$. In this equation, $f_n$ is the false negative rate, which is the chance of not detecting the watermark in the set of leaked records. For example, if a false negative rate of less than 0.001 (one chance in 1000) is wanted when a random subset of 10000 or more records is leaked and detected, then the P value should satisfy $(1-P)^{10000} < 0.001$. Solving this equation for P in this example, $P >= 0.0007$, which means that a ratio of 0.0007 artificial watermarking records to actual data records will allow a 99.9% chance of detecting at least one of the watermark records in a randomly leaked subset of 10000 or more records. In order to set a ratio of artificial records to all records as P, the number of artificial records needed to watermark a data set can be calculated as $SP/(1-P)$.

Figure 2:
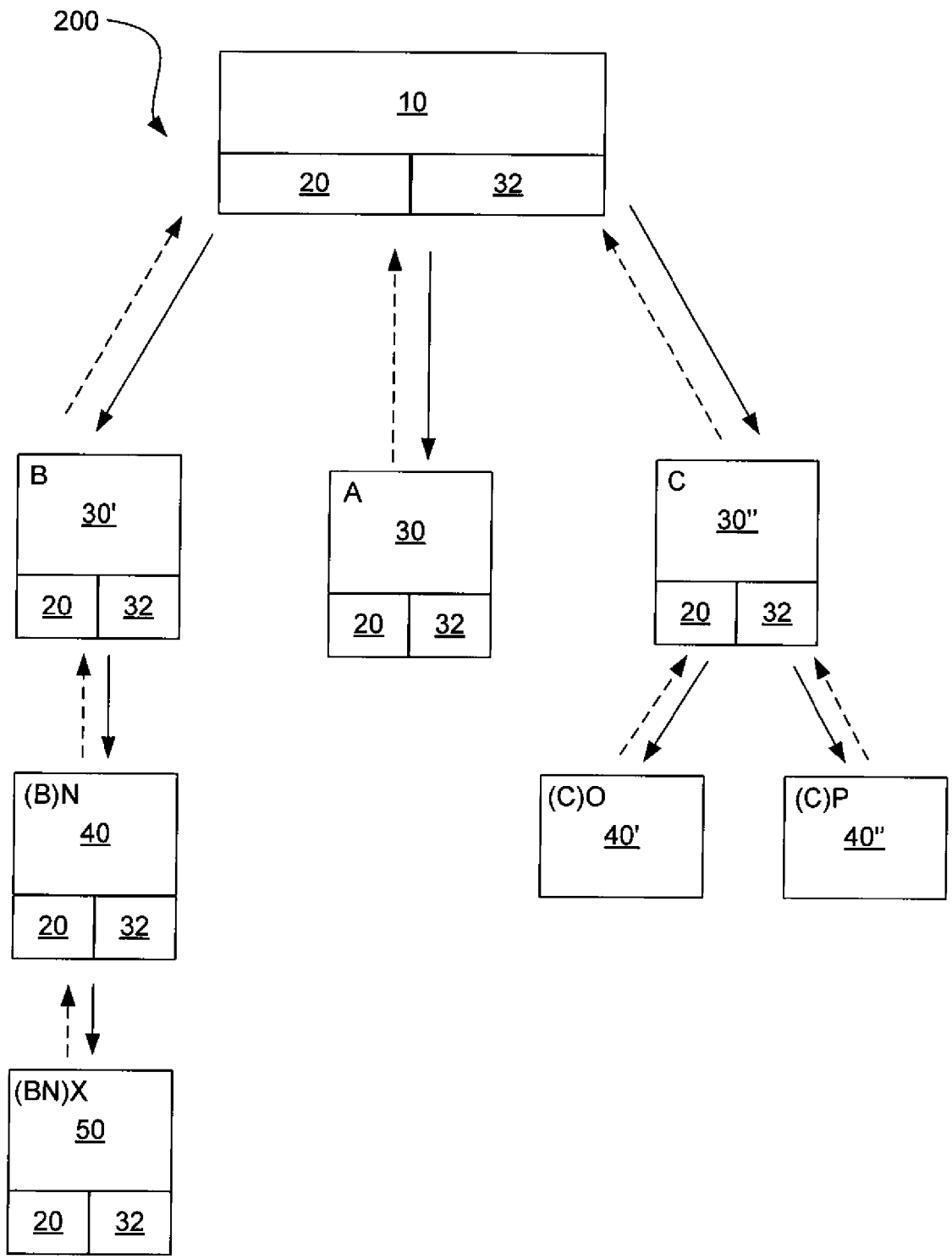
FIG. 2 is a schematic view of a data distribution network and a method of data distribution therein, both in accordance with embodiments of the present invention.

The present disclosure further provides methods for detecting data leaks in distribution systems where access can be passed through a chain of contractors. Referring to FIG. 2, in a particular embodiment such a network 200 can include contractors 30 and subcontractors 40 arranged in a plurality of hierarchically arranged contracting levels. Such a network is represented in distribution systems where contractors may have a direct agreement with the data owner or administrator to access data for provision of services, and the contractors are further able to subcontract their services. Subcontracting may require that the subcontractor be given access to at least a portion of the data granted to the contractor. A subcontractor may likewise need to subcontract their services with (and pass data on to) a sub-subcontractor 50, and so on down through a hierarchy of contracting levels. It should be noted that for the sake of brevity, contractors, subcontractors, sub-subcontractors, etc. may be referred to collectively herein as "contractors" where clarity does not require distinguishing between them. Likewise, subcontractors, sub-subcontractors, etc. may be referred to collectively as "subcontractors." In such a system, the task of maintaining data security can become more difficult in that with each subcontractor added to the data chain comes an additional risk of data being misappropriated. Often a data owner, while having a more direct relationship with first-level contractors, has little control over subcontractors and therefore only minimal assurances of their trustworthiness.

The present method can provide additional security in a multi-level data distribution network by allowing the determination of which contractor and/or subcontractor(s) are the source of leaked data. According to one method as further illustrated in FIG. 2, a contractor 30 requests (signified in FIG. 2 by dashed arrows) and is granted (signified by solid arrows) access to a view of a database 10 by an authorization service 20 and a watermarking module 32 adds a watermark (A, B, C, etc.) to the view as described above. In a particular embodiment, the watermark is unique to the contracting level that the contractor occupies. In a more particular embodiment, the watermark is substantially unique to the particular contractor.

As discussed above, the contractor may enter into an agreement with a subcontractor 40 that requires that the subcontractor have access to some of the data records granted to the contractor. Accordingly, the authorization service responsible for granting the subcontractor access to the watermarked view may reside with the contractor. Alternatively, the contractor's authorization service may provide a token to the subcontractor by which the subcontractor may negotiate access with a remote or central authorization service. In granting this access, the authorization service can also add artificial records to the view so as to create an additional watermark for the subcontractor. The additional watermark can be similar to the first in that it also comprises artificial records that cannot be distinguished from the actual data records by the subcontractor, and that are qualified for the same types of data processing as any of the actual data records.

The additional watermark can also be substantially unique to the subcontractor. Thus, in one example, the contractor might receive a first watermark. Then, in subcontracting, the subcontractor might receive in its data view not only the first watermark, but its own unique watermark. In this manner, leaks can be detected to contracting chains, which can be useful when determining the source of leaks when there are multiple contracting chains that have access to the data. This is illustrated in FIG. 2, for example where the watermark B is assigned to one contractor 30', and the view granted to a subcontractor 40 includes not only the contractor's watermark (B), but its own unique watermark N. (Parentheses indicate a watermark that is received by virtue of it having been assigned to a contractor at a higher level in the same chain.)

This process may be repeated at every additional subcontracting step, so that the data records available to any given subcontractor include a watermark unique to that subcontractor as well as a watermark for each contractor above him in the data chain. Referring again to FIG. 2, a sub-subcontractor 50 receives a view including both watermarks from higher contractors 30', 40 (BN) as well as its own unique watermark X. In each case, a subcontractor cannot detect the watermark created for him. In this way, if the subcontractor disseminates data to unauthorized receivers, and that data is discovered, it can be traced back to the leaker by recognizing the leaker's unique watermark.

This method provides a way to track the responsibility for a data leak to the leaker through a contracting chain. If a contractor or subcontractor leaks watermarked data and that data is discovered, then a contractor in that data chain may recognize a watermark placed in the data by that contractor or on his behalf. That contractor may then contact the subcontractor who received that watermark regarding the apparent leak. In this fashion, successive recognition of subcontractor watermarks can lead to the actual leaker. For example, referring again to FIG. 2, if subcontractor 50 leaks its data view containing watermarks (BN)X, the original holder of database 10 may be informed. This holder may recognize watermark B in the leaked data as having been given to contractor 30', and contact that contractor regarding the leak. Contractor 30' may in turn recognize watermark N in the leaked data and accordingly contact subcontractor 40. Subcontractor 40 may then recognize watermark X as having been placed in data granted to the leaker, subcontractor 50. As such, responsibility for the leak can be successfully identified with the proper contracting chain, and traced down that chain to the leaking party.

This method also deals with instances in which a contractor may, either willingly or negligently, aid a subcontractor in leaking information by removing a watermark. For example, while a contractor and subcontractor could conceivably detect the watermark added for the subcontractor by comparing data views and deleting the records not common to both, this approach would not aid in detecting the watermark created for the contractor. For the situation that the contractor directly provides the data view to the subcontractor, such comparison is not necessary, as the contractor directly controls the release of the data views. However, such a contractor-subcontractor collusion scheme can happen when both the contractor and its subcontractor receive their data views from an authorization service that belongs to a higher-level contractor. Referring again to FIG. 2, the contractor 30' and subcontractor 40 could possibly recognize N as being a watermark, but neither would be aware of the common watermark B. Therefore, if the "scrubbed" data is then leaked, it could still be traced to the contractor by recognizing that watermark. This possibility can deter a contractor from collaborating with a subcontractor to leak data. It would also incentivize the contractor to choose and monitor subcontractors more carefully, so as to avoid being held responsible for any unscrupulous activity by the latter.

Another possible risk in systems as described above is that two contractors in the same contracting level (two different contractors in two entirely different contracting chains) may collaborate to detect and remove the watermarks assigned to them. One possibility is that two contractors who have access to the same data records could compare their views, where both contractors could then discard all records not common to both of them. This would conceivably eliminate both contractors' watermarks, leaving both contractors a scrubbed data set. In a specific embodiment, this can be addressed by engineering a degree of overlap in watermarks granted to contractors in a given level. In this way, while a colluding pair of contractors may recognize parts of the watermark as such, they would fail to recognize those parts of the watermark common to them.

This feature is already provided in a sense in the trackable watermarking approach described above. For example, contractors 40' and 40" in FIG. 2 each receive views of the same actual data records, and also receive watermarks that have a common element C (part of the watermark of contractor 30). Therefore, while they may collude to recognize O and P as being watermarks because O and P contain records not shared between them, they may fail to detect the common watermark C. This approach may also be incorporated by using overlapping watermarks throughout the network, so that even first-level contractors (e.g. 30, 30', 30") may be prevented from successfully colluding to scrub data.

The methods disclosed herein also set forth characteristics of a network compatible with these methods. Accordingly, in an embodiment of the present disclosure, a network 200 can comprise a database 10 made up of data records stored on a computer server; a hierarchy of contracting levels, with each level including one or more contractors 30 (and optionally 40, 50); and an authorization service 20. The authorization service can be configured to grant contractors access to views of the database, and also be configured to add at least one watermark to each view. The watermarks are as described above in that each comprises one or more artificial records that cannot be distinguished from the data records by the contractor and are valid for processing in the same way as the data records. In a more detailed embodiment, the authorization service can also control access of subcontractors to contractors' data views and the watermarking module can add watermarks unique to each subcontractor or at least to the level the subcontractor occupies.

Summarizing and reiterating to some extent, methods of data distribution and data leak detection have been invented which allow a data owner to determine which among its contractors is a source of leaked data. The methods include watermarking data by adding processable artificial records to actual data records. While the forgoing exemplary embodiments are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

What is claimed is:

1. A method for secure distribution of data in an interchange network, the interchange network comprising an authorization service and a watermarking module, the method comprising:
   granting, by the authorization service, a contractor access to at least a portion of data records;
   interleaving, using the watermarking module executed in a computer, artificial records into the portion of the data records in a random fashion and at a frequency that provides a likelihood of greater than a non-zero threshold that a set of the data records includes at least one artificial record,
   wherein the artificial records cannot be distinguished from the data records by the contractor and are valid for processing in a same way as the data records, wherein the contractor is a first contractor that is part of a first level of hierarchical levels of contractors, and wherein the artificial records are unique to the first level;
   granting, by the authorization service, a second contractor access to at least a second portion of the data records, the second contractor part of a second level of the hierarchical levels of contractors; and
   interleaving, using the watermarking module executed in the computer, second artificial records into the second portion of the data records in a random fashion and at a frequency that provides a likelihood of greater than the non-zero threshold that a set of the data records includes at least one second artificial record, the second artificial records unique to the second level and including a portion different from a portion of the artificial records unique to the first level.

2. The method of claim 1, wherein interleaving the artificial records into the portion of the data records does not alter the data records.

3. The method of claim 1, wherein the data records also include artificial records that are unique to another contractor from which the first contractor receives the data records.

4. The method of claim 1, wherein the data records are part of a relational database.

5. The method of claim 1, wherein the artificial records unique to the first level share a common element with the second artificial records.

6. The method of claim 1, further comprising interleaving, using the watermarking module executed in the computer, at least a portion of the artificial records unique to the first level into the second portion of the data records.

7. A non-transitory storage medium storing machine-executable code that upon execution cause a computer to:
   create a view of a database comprising a plurality of data records for a first contractor;
   add to the view, using a watermarking module, a first watermark comprising first artificial records to generate a first watermarked view, the first artificial records interleaved with the plurality of data records in a random fashion and at a frequency that provides a likelihood of greater than a non-zero threshold that a set of the data records includes at least one first artificial record, wherein the first watermark is unique to the first contractor and differs from a second watermark unique to a second contractor and comprising second artificial records, where the first artificial records are not apparently distinguishable from the data records by the first contractor and are valid for processing in a same way as the data records, and wherein the second artificial records are not apparently distinguishable from the data records by the second contractor and are valid for processing in a same way as the data records;
   grant, using an authorization service, the first contractor access to the first watermarked view;
   identify the first contractor as a source of leaked data by recognizing first artificial records in the leaked data; and
   provide a second watermarked view to the second contractor, the second watermarked view comprising the second artificial records and at least a portion of the first artificial records.

8. The non-transitory storage medium of claim 7, wherein the machine-executable code upon execution causes the computer to identify the first and second contractors as a source of leaked data by recognizing artificial records included in both of the first and second watermarked views.

9. The non-transitory storage medium of claim 7, wherein the machine-executable code upon execution causes the computer to grant, using the authorization service, a subcontractor access to at least a portion of the first watermarked view for the first contractor.

10. The non-transitory storage medium of claim 7, wherein access to the first watermarked view granted to the first contractor is obtained from a higher-level contractor in a higher contracting level, and the first watermarked view includes a unique watermark for the higher-level contractor.

11. The non-transitory storage medium of claim 7, wherein adding the first watermark does not alter the data records.

12. The non-transitory storage medium of claim 7, wherein the watermarking module is included in the authorization service.

13. The non-transitory storage medium of claim 7, wherein the machine-executable code upon execution causes the computer to:
   create the second watermarked view by interleaving, using the watermarking module, the second artificial records of the second watermark into a second view comprising data records in a random fashion and at a frequency that provides a likelihood of greater than the non-zero threshold that a set of the data records in the second view includes at least one second artificial record.

14. The non-transitory storage medium of claim 7, wherein the first contractor is part of a first level of hierarchical levels of contractors, and the second contractor is part of a second, different level of the hierarchical levels of contractors, and wherein the first watermark is unique to the first level, and the second watermark is unique to the second level.

15. The non-transitory storage medium of claim 14, wherein the second contractor is a subcontractor of the first contractor.

16. A computer, comprising:
   a processor; and
   a non-transitory storage medium storing code executable on the processor to:
      grant a first contractor access to a first view of a database, the first view comprising a plurality of data records, the first contractor part of a first level of hierarchical levels of contractors;
      create a first watermarked view by adding a watermark to the first view, wherein the watermark comprises first artificial records that cannot be distinguished from the data records by the first contractor and are valid for processing in a same way as the data records, the first artificial records unique to the first level and interleaved with the data records in a random fashion and at a frequency that provides a likelihood of greater than a non-zero threshold that a set of the data records includes at least one first artificial record;
      grant a second contractor access to a second view of the database, the second contractor part of a second different level of the hierarchical levels of contractors; and
      create a second watermarked view by adding second artificial records into the second view in a random fashion and at a frequency that provides a likelihood of greater than the non-zero threshold that a set of data records in the second view includes at least one second artificial record, the second artificial records unique to the second level and including artificial records different from the first artificial records unique to the first level.

17. The computer of claim 16, wherein the code is executable on the processors to further:
   identify, by detecting at least one artificial record in leaked data records, a given contractor as a source of the leaked data records, wherein the identifying is based on detecting that the at least one artificial record is unique to the given contractor.

18. The computer of claim 16, wherein the second watermarked view includes the second artificial records and at least a portion of the first artificial records.

19. The computer of claim 18, wherein the second contractor is a subcontractor of the first contractor.

* * * * *